(12) United States Patent
Maeda (10) Patent No.: US 9,013,077 B2
(45) Date of Patent: Apr. 21, 2015

(54) ROTARY ELECTRIC MACHINE (75) Inventor: Shinsaku Maeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 303 days.

(21) Appl. No.: 13/812,291

(22) PCT Filed: Aug. 4, 2010

(86) PCT No.: PCT/JP2010/063204
§ 371 (c)(1),
(2), (4) Date: Jan. 25, 2013

(87) PCT Pub. No.: WO2012/017528
PCT Pub. Date: Feb. 9, 2012

(65) Prior Publication Data
US 2013/0119796 A1    May 16, 2013

(51) Int. Cl.
*H02K 9/06* (2006.01)
*H02K 9/14* (2006.01)
*H02K 9/18* (2006.01)

(52) U.S. Cl.
CPC .. *H02K 9/06* (2013.01); *H02K 9/14* (2013.01); *H02K 9/18* (2013.01)

(58) Field of Classification Search
USPC .......................................... 310/62–63, 58–59
See application file for complete search history.

(56) References Cited

U.S. PATENT DOCUMENTS

| 1,432,903 | A | * | 10/1922 | Reddig | 290/1 R |
| 1,761,587 | A | * | 6/1930 | Ringland | 310/63 |
| 2,244,406 | A | * | 6/1941 | Schonwald | 310/62 |
| 3,782,853 | A | * | 1/1974 | Frister | 416/132 R |
| 3,856,434 | A | * | 12/1974 | Hoffmann | 416/184 |
| 4,399,379 | A | * | 8/1983 | Marks et al. | 310/62 |
| 4,488,070 | A | * | 12/1984 | Iwaki et al. | 310/62 |
| 4,879,483 | A | * | 11/1989 | Barahia | 310/63 |
| 5,241,230 | A | * | 8/1993 | Tanaka et al. | 310/62 |

(Continued)

FOREIGN PATENT DOCUMENTS

| JP | 3-118745 A | 5/1991 |
| JP | 4-207935 A | 7/1992 |
| JP | 7-194059 A | 7/1995 |

(Continued)

OTHER PUBLICATIONS

International Search Report (PCT/ISA/210) issued on Nov. 2, 2010, by the Japanese Patent Office as the International Searching Authority for International Application No. PCT/JP2010/063204.

(Continued)

*Primary Examiner* — Thanh Lam
(74) *Attorney, Agent, or Firm* — Buchanan Ingersoll & Rooney PC (57) ABSTRACT

To include a stator, a rotor that is arranged within the stator, a frame that encloses the stator and the rotor, a pair of bearings that respectively support a driving side and a driven side of a rotary shaft, and a fan that is mounted on the rotary shaft. A plurality of blades that extend in a radial direction of the rotor and are provided to stand at a substantially equal interval in a rotation direction of the rotor are formed in the fan. A cross section of each of the blades in a direction perpendicular to the rotor has an elliptical shape extending in the radial direction, and the cross section widens toward a side of the fan.

12 Claims, 8 Drawing Sheets

(56) References Cited

U.S. PATENT DOCUMENTS

| | | | |
|---|---|---|---|
| 5,693,992 A | 12/1997 | Kurusu et al. | |
| 2001/0010434 A1* | 8/2001 | Ishida et al. | 310/43 |

FOREIGN PATENT DOCUMENTS

| | | |
|---|---|---|
| JP | 2003-023754 A | 1/2003 |
| JP | 2003-088045 A | 3/2003 |
| JP | 2008-002447 A | 1/2008 |
| JP | 2008-115790 A | 5/2008 |

OTHER PUBLICATIONS

Written Opinion (PCT/ISA/237) issued on Nov. 2, 2010, by the Japanese Patent Office as the International Searching Authority for International Application No. PCT/JP2010/063204.

Chinese Office Action (First) dated Jul. 1, 2014, issued in corresponding Chinese Patent Application No. 2010800067936.6 and an English translation thereof. (17 pgs).

* cited by examiner

ROTARY ELECTRIC MACHINE

FIELD

The present invention relates to a rotary electric machine that is applied to a railway vehicle, and more particularly to a blade structure of a fan installed on a rotor shaft.

BACKGROUND

A conventional rotary electric machine that is applied to a railway vehicle is rotated in a normal direction and a reverse direction with equal frequency because a railway vehicle moves in a forward direction and a rearward direction with equal frequency. Therefore, an internal fan or an external fan used in the rotary electric machine uses a flat blade or a blade in which a straight line and an arch are combined (for example, Patent Literature 1 mentioned below).

Meanwhile, a conventional rotary electric machine that is applied to a railway vehicle is required to further enhance cooling efficiency by increasing an air flow amount in a fan, while achieving reduction in its size. However, because noise generated from the fan increases in proportion to the cooling efficiency (that is, the air flow amount), there is a case where the noise level cannot satisfy a required noise value. Therefore, the conventional rotary electric machine employs a method of selecting a fan that generates a reduced amount of air flow such that a noise value falls within a required range while cooling efficiency is decreased.

However, when the rotary electric machine is designed by this method, a fan with low cooling efficiency is selected, and therefore a heat amount generated from the rotary electric machine needs to be decreased. In order to decrease this heat amount, for example, it is a common procedure to increase an amount of copper in a rotor bar provided in a rotor, to thereby decrease a resistance. However, the common procedure inevitably increases the size of the rotary electric machine. As described above, when the value of noise generated from the fan is high, the air flow amount has to be decreased, and when the air flow amount is decreased, cooling efficiency is reduced. Accordingly, the heat generation amount itself in the rotary electric machine needs to be decreased. As a result, there is a problem that the size of the rotary electric machine has to be increased. Therefore, further improvements of the fan have been desired.

CITATION LIST

Patent Literature

Patent Literature 1: Japanese Patent Application Laid-open No. 2003-88045 (FIGS. 2 and 4)

SUMMARY

Technical Problem

In a rotary electric machine shown in Patent Literature 1 mentioned above, a cross sectional shape of the blade is constituted by combining a straight line and an arc. Therefore, there is a problem that cooling air passing near the blade flows away from a rear part of the blade, that is, a straight part of the blade frequently and generates swirl or turbulence, and this may be a cause of noise.

The preset invention has been achieved to solve the above problems, and an object of the present invention is to provide a rotary electric machine that is capable of suppressing noise generated from a fan without decreasing an air flow amount.

Solution to Problem

There is provided a rotary electric machine comprising: a stator; a rotor that is arranged within the stator; a frame that encloses the stator and the rotor; a pair of bearings that respectively support a driving side and a driven side of a rotary shaft; and a fan that is installed on inside of the rotary electric machine, that is mounted on the rotary shaft, and that stirs air in the inside of the rotary electric machine, wherein a plurality of blades that extend in a radial direction of the rotor and that are provided to stand at a substantially equal interval in a rotation direction of the rotor are formed in the fan, and a cross section of each of the blades in a direction perpendicular to the rotor has an elliptical shape extending in the radial direction, and the cross section widens toward a side of the fan.

Advantageous Effects of Invention

According to the present invention, a cross section of a blade in a direction perpendicular to a rotor has an elliptical shape extending in a radial direction, and widens toward a fan side. Therefore, noise can be suppressed without decreasing an air flow amount.

DESCRIPTION OF EMBODIMENTS

Exemplary embodiments of a rotary electric machine according to the present invention will be explained below in detail with reference to the accompanying drawings. The present invention is not limited to the embodiments.

Embodiment

Figure 1:
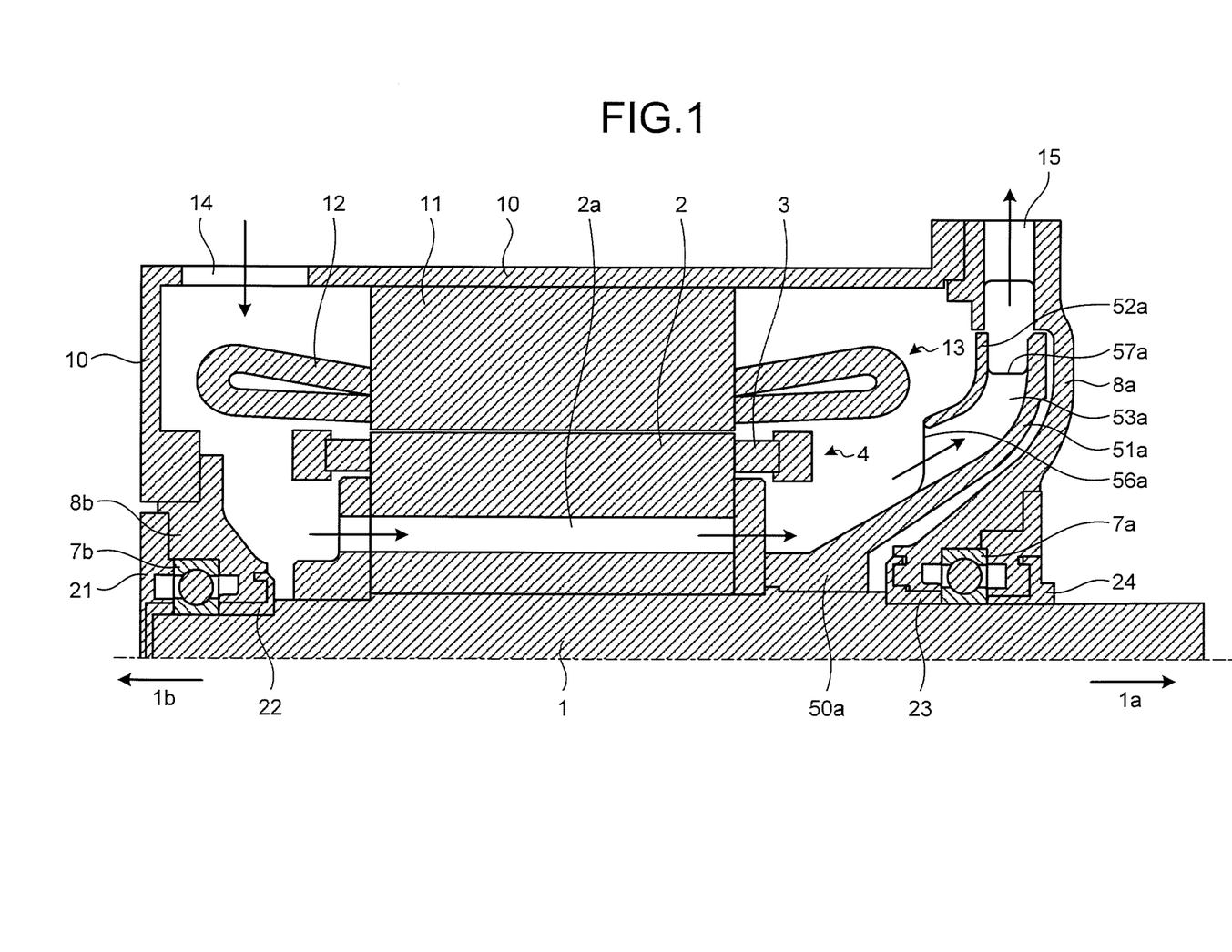
FIG. 1 is a cross-sectional view of a rotary electric machine according to an embodiment of the present invention.

FIG. 1 is a cross-sectional view of a rotary electric machine according to an embodiment of the present invention. In FIG. 1, in a case of a rotary electric machine for a railway vehicle, for example, a driving side 1a of a rotary shaft 1 is connected to an axle (not shown) of the railway vehicle via a coupling (not shown) and a reduction gear (not shown), and a wheel (not shown) mounted on the axle is configured to be driven to run the vehicle.

A plurality of air passages 2a extending through in an axial direction of the rotary shaft 1 are formed in a rotor iron core 2 integrated into the rotary shaft 1. A rotor conductor 3 is arranged on an outer periphery of the rotor iron core 2. A rotor 4 is configured to include the rotor iron core 2 and the rotor conductor 3.

An external fan 50a shown in FIG. 1 is mounted on the driving side 1a of the rotary shaft 1 and installed such that cooling air having passed through the air passages 2a can be discharged to outside of the rotary electric machine.

The driving side 1a of the rotary shaft 1 is rotatably supported by a bearing 7a arranged in a driving-side bracket 8a. The bearing 7a is positioned by a stopper 23 and a stopper 24. A driven side 1b of the rotary shaft 1 is rotatably supported by a bearing 7b arranged in a driven-side bracket 8b. The bearing 7b is positioned by a stopper 21 and a stopper 22.

A stator iron core 11 is arranged on an inner side of a frame 10 to be opposed to the rotor iron core 2. A stator winding 12 is arranged on the stator iron core 11. A stator 13 is configured to include the stator iron core 11 and the stator winding 12.

An inlet hole 14 is formed on a part of the frame 10 on the driven side 1b. An outlet hole 15 that is open in an outer peripheral direction of the frame 10 is formed on the driving-side bracket 8a.

An operation of the rotary electric machine is explained. Cooling air introduced through the inlet hole 14 into the inside of the rotary electric machine (a space surrounded by the frame 10, the driving-side bracket 8a, and the driving-side bracket 8a) absorbs heat of the rotor 4 when the cooling air passes through the air passages 2a. The cooling air having passed through the air passages 2a is introduced from an inner peripheral side of a ring 52a into a space defined by a blade 53a, the ring 52a, and a main plate 51a. The cooling air is then released in an outer peripheral direction of the external fan 50a, and is discharged through the outlet hole 15 to the outside of the rotary electric machine.

A structure of a blade 53 according to the present embodiment is explained next in detail. The blade 53 explained here is assumed to be applicable to the blade 53a shown in FIG. 1. In the following explanations, a shape of the blade 53 is explained first with reference to FIGS. 2 to 6, and then a conventional blade and the blade 53 according to the present embodiment are compared and explained with reference to FIGS. 7 to 9.

Figure 2:
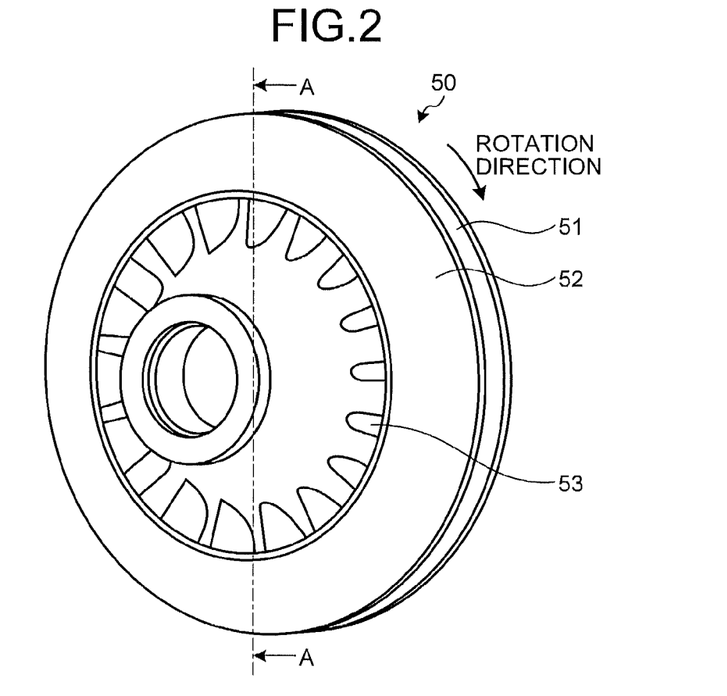
FIG. 2 is a perspective view of a blade according to the embodiment of the present invention.
Figure 3:
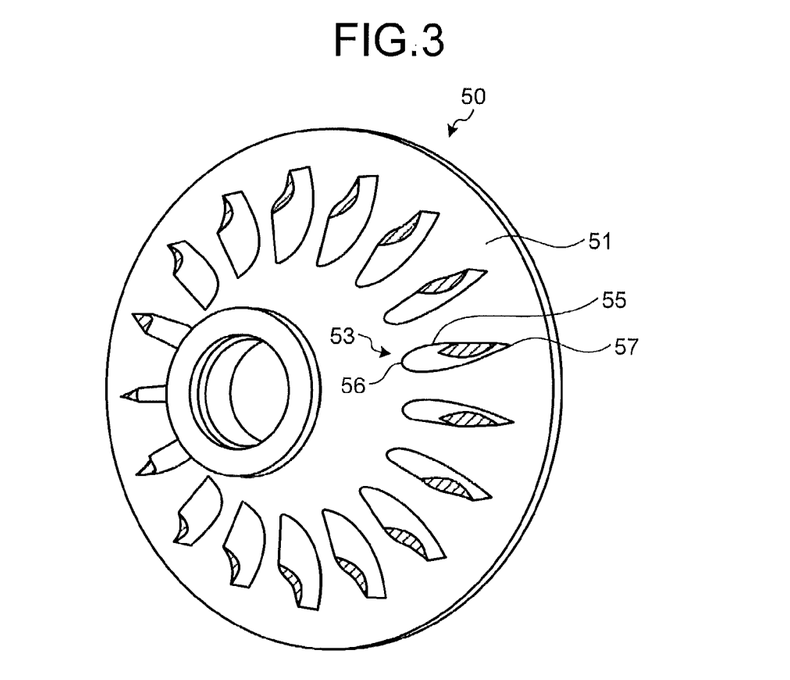
FIG. 3 is a perspective view of a fan in a state where a ring is removed.
Figure 4:
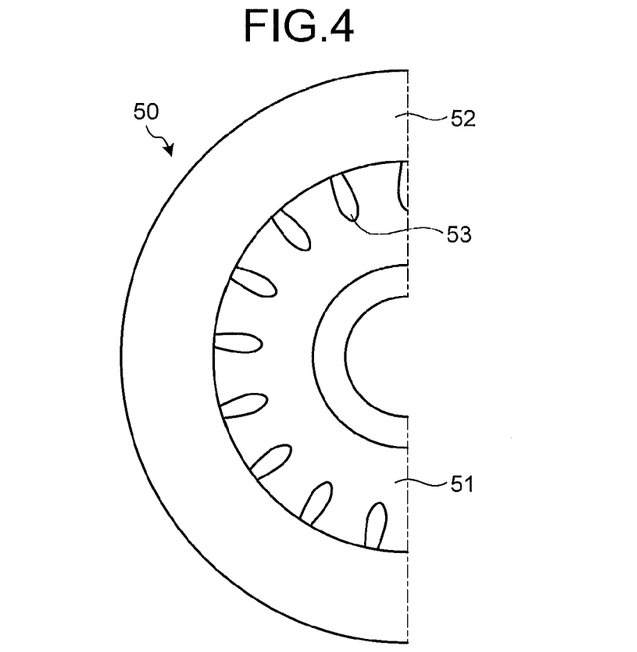
FIG. 4 is a front view of relevant parts of a fan shown in FIG. 2.
Figure 5:
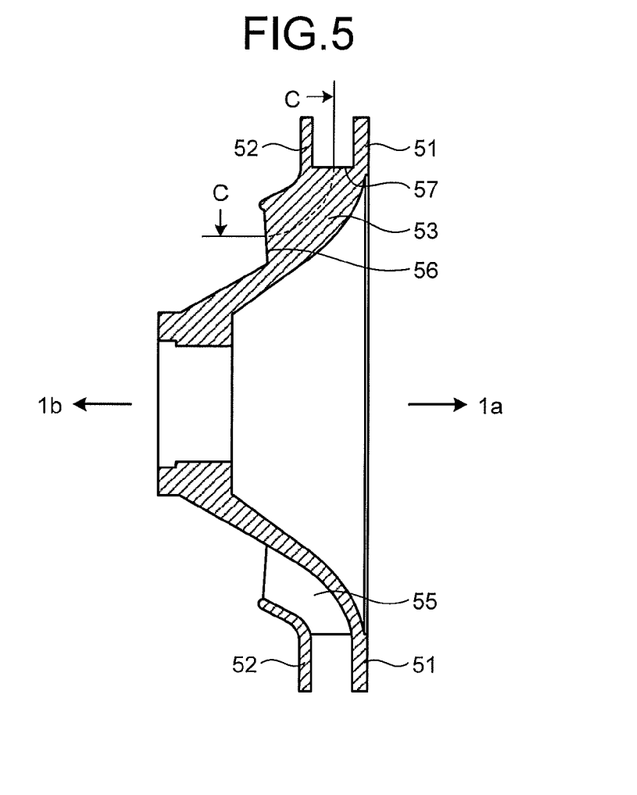
FIG. 5 is a cross-sectional view of the fan shown in FIG. 2 taken along the line A-A.
Figure 6:
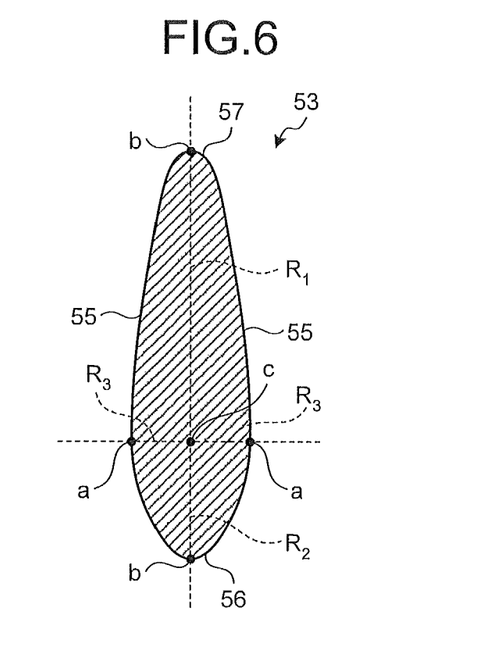
FIG. 6 is a cross-sectional view of the fan shown in FIG. 5 taken along the line C-C.

FIG. 2 is a perspective view of the blade 53 according to the present embodiment, FIG. 3 is a perspective view of a fan 50 in a state where a ring 52 is removed, FIG. 4 is a front view of relevant parts of the fan 50 shown in FIG. 2, FIG. 5 is a cross-sectional view of the fan 50 shown in FIG. 2 taken along the line A-A, and FIG. 6 is a cross-sectional view of the fan 50 shown in FIG. 5 taken along the line C-C.

In FIGS. 2 and 3, the fan 50 is configured to mainly include a disk-shaped main plate 51 that is formed with a through hole through which the rotary shaft 1 is inserted, a plurality of blades 53 that extend in a radial direction of the main plate 51 and are arranged at a substantially equal interval in a rotation direction, and the ring 52 that holds an end opposite to the main plate 51 of each of the blades 53 in a direction of the rotary shaft 1.

The ring 52 holds the end opposite to the main plate 51 of each of the blades 53 to suppress swinging of the blades 53, and effectively introduces cooling air in a direction from a blade front-edge portion 56 to a blade rear-edge portion 57.

As shown in FIGS. 3 and 5, the blades 53 installed between the ring 52 and the main plate 51 with a conical shape have a shape of widening from the ring 52 toward the main plate 51. This shape ensures a sufficient contact area between the main plate 51 and the blade 53, and can suppress swinging of the blade rear-edge portion 57.

In addition, the blade 53 relatively has a tapered shape narrowing from the main plate 51 toward the ring 52. This shape does not impair the flow rate of cooling air introduced into a space defined by the blade 53, the ring 52, and the main plate 51.

While the blades 53 shown in FIGS. 3 and 5 are formed into a shape of widening toward a rotation direction and a radial direction of the fan 50, the shape is not limited thereto. The blade 53 can be also formed into a shape of widening only toward a rotation direction of the fan 50, or can be formed into a shape of widening only toward a radial direction of the fan 50.

In FIGS. 4 and 5, the blade 53 is provided to be interposed between the ring 52 and the main plate 51. Therefore, as viewed in a direction from the driven side 1b toward the front of the fan 50, the blade rear-edge portion 57 and a part of a blade side portion 55 are hidden by the ring 52. Cooling air is introduced from an inner peripheral side of the ring 52 into a space that is defined by the blade 53, the ring 52, and the main plate 51, and the cooling air is then released in an outer peripheral direction of the fan 50.

The shape of the blade 53 is explained next in detail with reference to FIG. 6. FIG. 6 depicts the shape of the blade 53 in cross section in a direction perpendicular to the rotor 4, and it is a shape as viewed in a direction from the rotor 4 shown in FIG. 1 toward the front of the fan 50.

The blade 53 is configured to include the blade front-edge portion 56 that is formed in a center direction of the main plate 51 and constitutes a front end of the blade 53, the blade rear-edge portion 57 that is formed in an outer peripheral direction of the main plate 51 and constitutes a rear end of the blade 53, and the blade side portion 55 that is formed in a rotation direction of the rotor 4 and is interposed between the blade front-edge portion 56 and the blade rear-edge portion 57.

The blade front-edge portion 56 is formed into a tapered shape that is tapered narrowing toward the lower side in FIG. 6 (that is, the center direction of the main plate 51). The blade rear-edge portion 57 is formed into a tapered shape that is tapered narrowing toward the upper side in FIG. 6 (that is, the outer peripheral direction of the main plate 51).

To explain the shape of the blade 53 more specifically, terms are defined as follows. A top (first top) of the blade 53 in a rotation direction of the rotor 4 is defined as "a". A top of the blade 53 in a radial direction of the fan 50 shown in FIG. 6 is defined as "b". An intersection of an axis passing a line a-a and an axis passing a line b-b is defined as "c".

It is understood in FIG. 6 that a distance R1 between the intersection c and the top b of the blade rear-edge portion 57 and a distance R2 between the intersection c and the top b of the blade front-edge portion 56 are set to different values.

Furthermore, the blade 53 is formed such that a radius of curvature on a side of the blade front-edge portion 56 becomes larger toward the lower side in FIG. 6, and a radius of curvature on a side of the blade rear-edge portion 57 becomes larger toward the upper side in FIG. 6. That is, a radius of curvature from the intersection c becomes larger toward the top (second top) b of the blade front-edge portion 56, and a radius of curvature from the intersection c becomes larger toward the top (third top) b of the blade rear-edge portion 57.

A curved surface on the lower side of the axis passing the line a-a (that is, the blade front-edge portion 56) is formed with a radius of curvature larger than a distance R3 between the line a-a. R2 represents a distance with the maximum radius of curvature, and R2 is larger than R3 (R2>R3).

Similarly, a curved surface on the upper side of the axis passing the line a-a (that is, the blade rear-edge portion 57) is formed with a radius of curvature larger than R3. R1 represents a distance with the maximum radius of curvature, and R1 is larger than R3 (R1>R3).

In FIG. 6, R1 is set to be larger than R2, and R2 is set to be larger than R3 (R1>R2>R3) as an example; however, the relationship among them is not limited thereto. R2 can be larger than R1, and R1 can be larger than R3 (R2>R1>R3).

In this manner, the blade 53 according to the present embodiment has a symmetrical wing shape with respect to the axis passing the line b-b. In FIG. 1, cooling air introduced from the inlet hole 14 passes within the air passages 2a in the rotor 1, and is introduced into the external fan 50a and discharged out of the rotary electric machine. In a case of employing a conventional fan, noise increases as a rotation amount of the fan increases, and therefore, for example, it is necessary to take a procedure to increase an amount of copper in a rotor bar provided in a rotor, thereby decreasing a resistance. In the present embodiment, the external fan 50a shown in FIG. 1 uses the blade 53 having a symmetrical wing shape shown in FIG. 6. Therefore, noise generated from the external fan 50a is significantly reduced as compared to an external fan employing a conventional blade.

A correspondence relationship between constituent elements of the external fan 50a shown in FIG. 1 and constituent elements of the fan 50 shown in FIGS. 2 to 5 is as follows. The main plate 51a shown in FIG. 1 corresponds to the main plate 51 shown in FIGS. 2 to 5. Similarly, the blade 53a, a blade front-edge portion 56a, a blade rear-edge portion 57a, and the ring 52a correspond to the blade 53, the blade front-edge portion 56, the blade rear-edge portion 57, and the ring 52, respectively. When the blade 53 shown in FIGS. 2 to 5 is applied to the blade 53a shown in FIG. 1, the rotation amount of the external fan 50 can be increased by the amount of reduction in noise from the fan 50a, thereby increasing the air flow amount. Therefore, it is possible to avoid an increase in size of the rotary electric machine.

Next, a conventional blade and a blade according to the present embodiment are compared and explained with reference to FIGS. 7 to 9.

Figure 7:
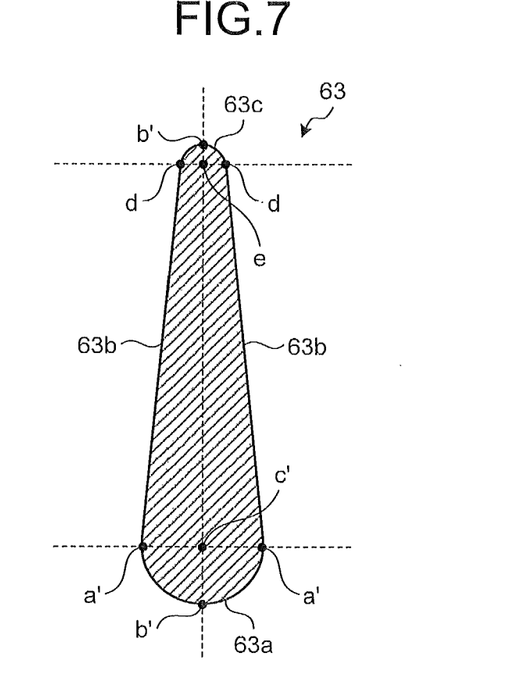
FIG. 7 is a cross-sectional view of a conventional blade in which a straight line and an arc are combined.
Figure 8:
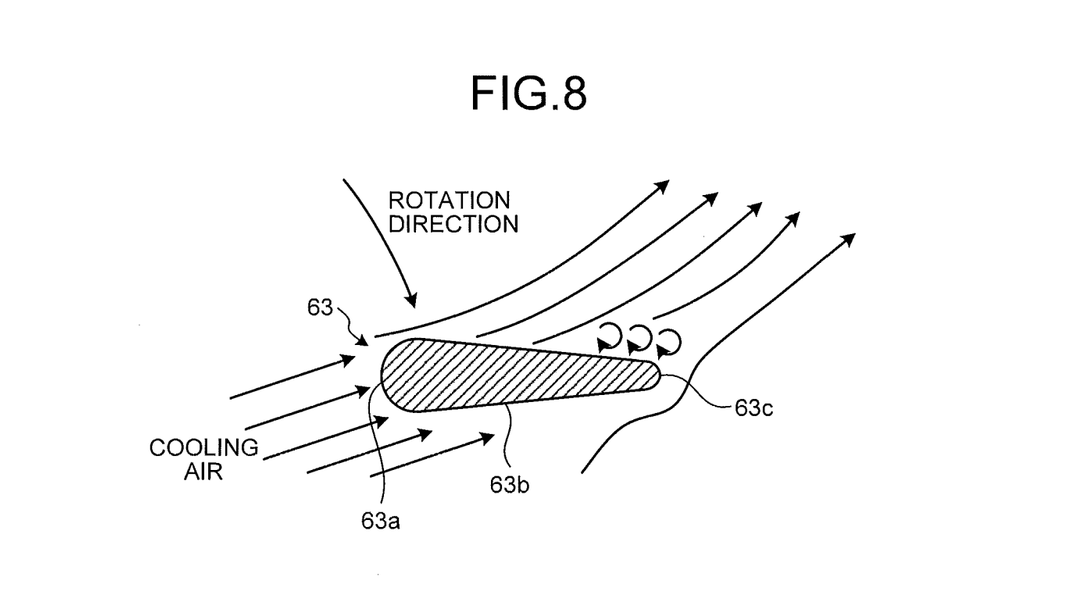
FIG. 8 is an explanatory diagram of a flow of cooling air passing through the blade shown in FIG. 7.

FIG. 7 is a cross-sectional view of a conventional blade 63 in which a straight line and an arc are combined, and FIG. 8 is an explanatory diagram of a flow of cooling air passing through the blade 63 shown in FIG. 7.

FIG. 7 depicts a cross sectional shape of the conventional blade 63 in a direction perpendicular to the rotor 4 when the blade 63 is applied to the fan 50 shown in FIG. 2 and is viewed in a direction from the rotor 4 shown in FIG. 1 toward the front of the fan 50.

To explain differences between the blade 53 according to the present embodiment and the conventional blade 63, terms are defined as follows. A top of the blade 63 in a circumferential direction of the rotor 4 is defined as "a'". A top of the blade 63 in a radial direction of the fan 50 shown in FIG. 7 is defined as "b'". An intersection of an axis passing a line a'-a' and an axis passing a line b'-b' is defined as "c'".

Furthermore, on a side of a blade rear-edge portion 63c, an end of a straight blade side portion 63b is defined as "d" and an intersection of an axis passing a line d-d and the axis passing the line b'-b' is defined as "e".

It is understood that in the conventional blade 63, a radius of curvature from the intersection c' is smaller toward the top b' of a blade front-edge portion 63a, and a radius of curvature from the intersection e is smaller toward the top b' of the blade rear-edge portion 63c. In addition, in the conventional blade 63, the blade side portion 63b extending from the top a' to the end d is formed into a straight line.

FIG. 8 depicts a flow of cooling air passing from the blade front-edge portion 63a to the blade rear-edge portion 63c when the fan 50 shown in FIG. 2 rotates in the rotation direction shown in FIG. 2. In this case, cooling air enters from a direction oblique to the axis connecting the top of the blade front-edge portion 63a and the top of the blade rear-edge portion 63c. The cooling air is separated into an upper flow and a lower flow in FIG. 8, and then the upper and lower flows respectively pass along the blade side portion 63b and join again at the blade rear-edge portion 63c.

However, the cooling air passing along the blade side portion 63b on its upper side in FIG. 8 frequently flows away from the vicinity which reaches from the blade side portion 63b to the blade rear-edge portion 63c. As a result, there is a case where swirl or turbulence is generated, which can appear as noise.

Figure 9:
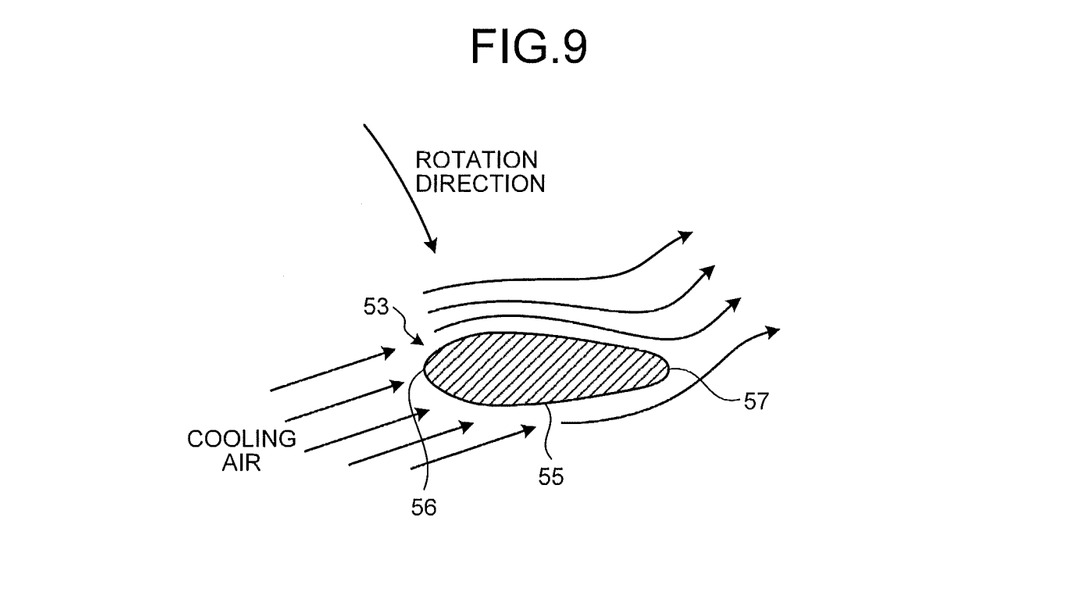
FIG. 9 is an explanatory diagram of a flow of cooling air passing through the blade according to the embodiment.

FIG. 9 is an explanatory diagram of a flow of cooling air passing through the blade 53 according to the present embodiment. FIG. 9 depicts a flow of cooling air passing from the blade front-edge portion 56 to the blade rear-edge portion 57 when the fan 50 shown in FIG. 2 rotates in the rotation direction shown in FIG. 2. In this case, cooling air enters from a direction oblique to the axis connecting the top of the blade front-edge portion 56 and the top of the blade rear-edge portion 57. The cooling air is separated into an upper flow and a lower flow in FIG. 9, and then the upper and lower flows respectively pass along the blade side portion 55 and join again at the blade rear-edge portion 57.

In the blade 53 shown in FIG. 9, cooling air passing along the blade side portion 55 on its upper side in FIG. 9 does not flow away from the vicinity which reaches from the blade side portion 55 to the blade rear-edge portion 57. Therefore, generation of swirl or turbulence shown in FIG. 8 is suppressed.

Figure 10:
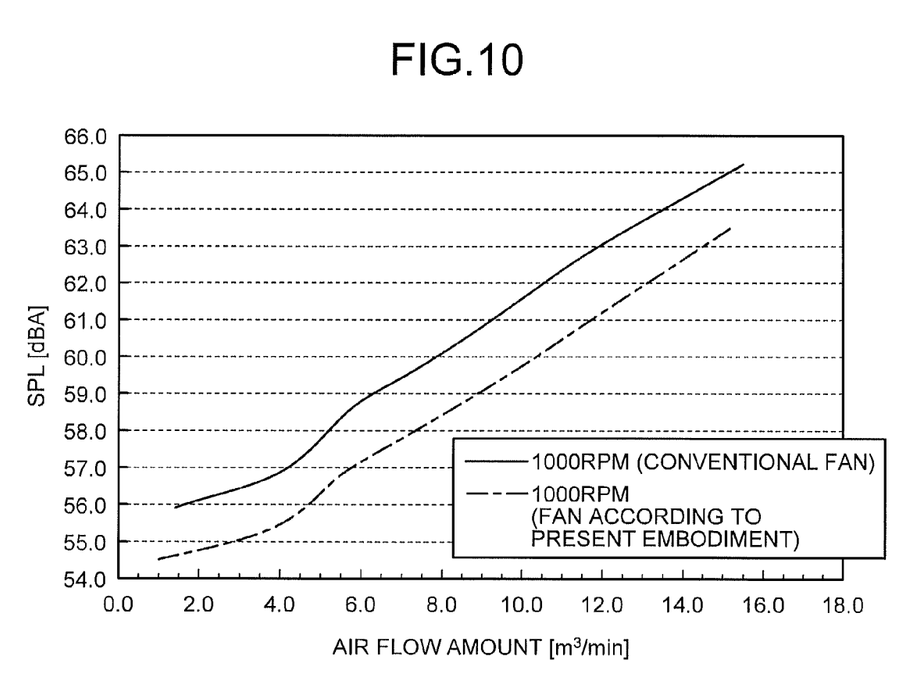
FIG. 10 depicts a comparison between a noise volume generated by the conventional blade and a noise volume generated by the blade according to the embodiment.

FIG. 10 depicts a comparison between a noise volume generated by the conventional blade 63 and a noise volume generated by the blade 53 according to the present embodiment. The solid line represents data of a relationship between an air flow amount and a noise value (dBA) observed in the rotary electric machine using the conventional blade 63. Meanwhile, the dotted line represents data of a relationship between an air flow amount and a measured noise value observed in the rotary electric machine using the blade 53 according to the present embodiment.

As shown in FIG. 10, it is understood that when the values of generated noise are compared at the same point of air flow amount, the noise value in the rotary electric machine using the blade 53 according to the present embodiment is smaller by about 1 (dBA) or more than the noise value in the rotary electric machine using the conventional blade 63.

While in the above explanations, the frame 10, the driving-side bracket 8a, and the driven-side bracket 8b are configured separately from each other, the configuration is not limited thereto. For example, the frame 10, the driving-side bracket 8a, and the driven-side bracket 8b shown in FIG. 1 can be replaced with a frame in which these elements are configured integrally with each other.

Next, an embodiment in which the fan 50 shown in FIGS. 2 to 5 is applied to a fan having another mode is explained.

Figure 11:
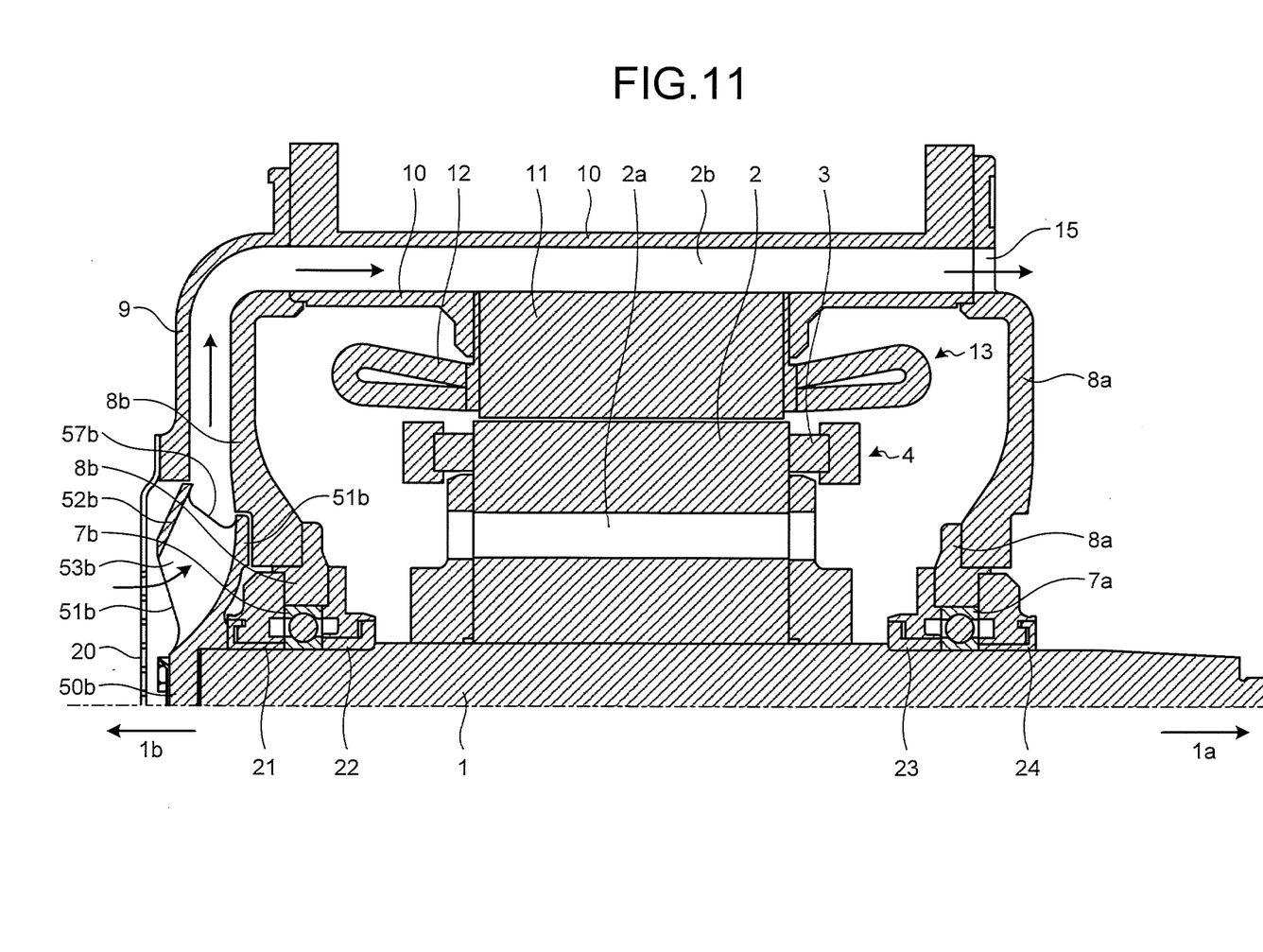
FIG. 11 is a cross-sectional view of a rotary electric machine in which the blade structure according to the embodiment of the present invention is applied to an external fan mounted on a driven side.

FIG. 11 is a cross-sectional view of a rotary electric machine in which the blade structure according to the embodiment of the present invention is applied to an external fan 50b mounted on a driven side. Constituent elements similar to those of the rotary electric machine shown in FIG. 1 are denoted by the same reference signs and explanations thereof will be omitted, and elements different from those shown in FIG. 1 are explained below.

In a central portion of a fan cover 9 installed on an outer side of the driven-side bracket 8b, an opening is formed such that outside air can be introduced. A filter 20 that captures dust contained in cooling air introduced from the outside of the rotary electric machine into the frame 10 is installed in the opening.

The external fan 50b is fitted to an end of the rotary shaft 1 on the driven side 1b and is fixed by a predetermined bolt screwed from the driven side 1b into the rotary shaft 1. The fan cover 9 communicates with an air passage 2b formed in an interior of the frame 10. Therefore, when the rotary shaft 1 rotates, cooling air introduced through the external fan 50b flows through the fan cover 9 and the air passage 2b and is discharged from the outlet hole 15. The cooling air flows in this manner, thereby efficiently cooling the rotary electric machine.

The external fan 50b is configured to mainly include a disk-shaped main plate 51b that is installed on the rotary shaft 1, a plurality of blades 53b that extend in a radial direction of the main plate 51b, are arranged at a substantially equal interval in the rotation direction, and are formed such that cooling air from outside can be introduced into the inside of the rotary electric machine, and a ring 52b that holds the other end of each of the blades 53b from the driven side 1b.

Because the blade 53b has similar shape to the blade 53 shown in FIGS. 2 to 6, noise generated from the external fan 50b is significantly reduced as compared to an external fan employing a conventional blade.

According to the rotary electric machine using the external fan 50b shown in FIG. 11, the rotation amount of the external fan 50b can be increased by the amount of the noise reduction, thereby increasing the air flow amount. Therefore, it is possible to avoid an increase in size of the rotary electric machine. As a result, reduction in size of the rotary electric machine can be achieved, and it is possible to reduce costs of the rotary electric machine.

While in FIG. 11, the external fan 50b is fitted to the end of the rotary shaft 1, the configuration is not limited thereto. For example, the external fan 50b can be fixed by extending the rotary shaft 1 penetrating through the external fan 50b. Furthermore, while the frame 10, the fan cover 9, the driven-side bracket 8b, and the driving-side bracket 8a are configured separately from each other, the configuration is not limited thereto. For example, the rotary electric machine can be configured by using a frame in which these elements are formed integrally with each other.

A correspondence relationship between constituent elements of the external fan 50b shown in FIG. 11 and constituent elements of the fan 50 shown in FIGS. 2 to 5 is as follows. The main plate 51b shown in FIG. 11 corresponds to the main plate 51 shown in FIGS. 2 to 5. Similarly, the blade 53b, a blade front-edge portion 56b, a blade rear-edge portion 57b, and the ring 52b correspond to the blade 53, the blade front-edge portion 56, the blade rear-edge portion 57, and the ring 52, respectively. When the blade 53 shown in FIGS. 2 to 5 is applied to the blade 53b shown in FIG. 11, the rotation amount of the external fan 50b can be increased by the amount of reduction in noise from the external fan 50b, thereby increasing the air flow amount. Therefore, it is possible to avoid an increase in size of the rotary electric machine.

Figure 12:
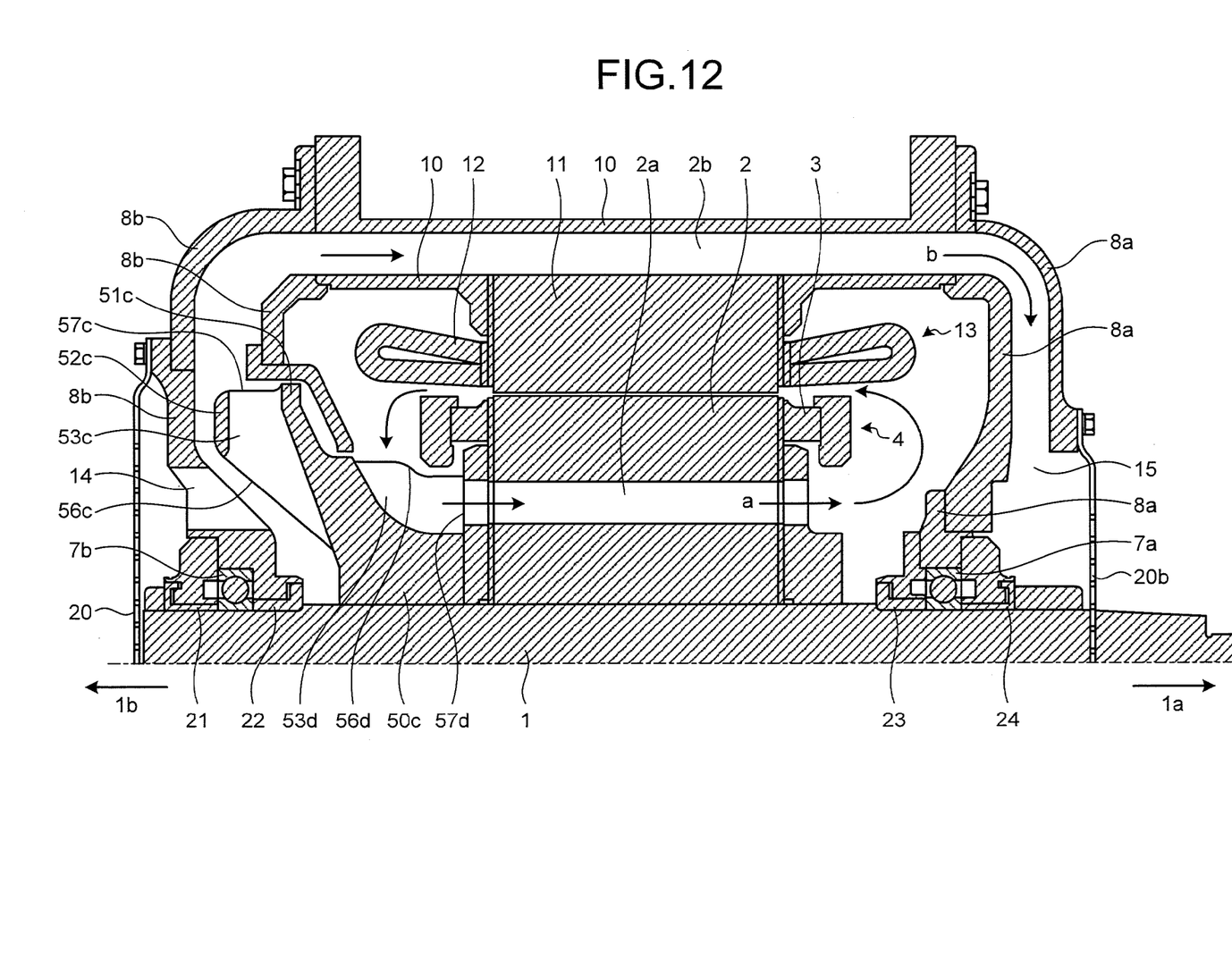
FIG. 12 is a cross-sectional view of a rotary electric machine in which the blade structure according to the embodiment of the present invention is applied to an internal-external-integrated fan mounted on a driven side.

FIG. 12 is a cross-sectional view of a rotary electric machine in which the blade structure according to the embodiment of the present invention is applied to an internal-external-integrated fan 50c mounted on the driven side. Constituent elements similar to those of the rotary electric machine shown in FIGS. 1 and 11 are denoted by the same reference signs and explanations thereof will be omitted, and elements different from those shown in these drawings are explained below.

A plurality of inlet holes are formed at predetermined positions of the driven-side bracket 8b such that outside air can be introduced. The filter 20 is installed to cover the inlet holes. The inlet holes are provided around the bearing 7b, for example.

The internal-external-integrated fan 50c is installed on the driven side 1b of the rotor 4, and is configured to mainly include: a disk-shaped main plate 51c; a plurality of blades 53c that extend in a radial direction of the main plate 51c, and that are arranged at a substantially equal interval in the rotation direction, and that are formed such that cooling air from outside can be introduced into the inside of the rotary electric machine; a ring 52c that holds the other end of each of the blades 53c from the driven side 1b; and a plurality of blades 53d that are arranged between the main plate 51c and the rotor 4 and that are formed such that air around the stator 13 and the rotor 4 can be stirred.

Cooling air introduced by the blades 53c is discharged from the outlet hole 15 through a route shown by an arrow b. That is, cooling air flows through the air passage 2b formed by communicating the driven-side bracket 8b with the frame 10, and is discharged through the outlet hole 15 and a filter 20b to the outside of the rotary electric machine. While in FIG. 12, the filter 20b is installed on a side of the outlet hole 15 as an example, the configuration is not limited thereto, and it is also possible to employ a mode in which the filter 20b is not installed.

Because the blade 53c has similar shape to the blade 53 shown in FIGS. 2 to 6, noise generated from the internal-external-integrated fan 50c is significantly reduced as compared to an external fan employing a conventional blade.

Meanwhile, air stirred by the blades 53d is circulated through a route shown by an arrow a, for example. In the rotary electric machine shown in FIG. 12, because the internal-external-integrated fan 50c and the rotor 4 rotate together, a slight gap is inevitably provided between the driven-side bracket 8b and the internal-external-integrated fan 50c. Therefore, the air stirred by the blades 53d includes air entering from a gap portion between the main plate 51c and the driven-side bracket 8b into and the vicinity of the rotor 4.

A correspondence relationship between constituent elements of the internal-external-integrated fan 50c shown in FIG. 12 and constituent elements of the fan 50 shown in FIGS. 2 to 5 is as follows. The main plate 51c shown in FIG. 12 corresponds to the main plate 51 shown in FIGS. 2 to 5. Similarly, the blade 53c, a blade front-edge portion 56c, a blade rear-edge portion 57c, and the ring 52c correspond to the blade 53, the blade front-edge portion 56, the blade rear-edge portion 57, and the ring 52, respectively.

As described above, when the blade 53 shown in FIGS. 2 to 5 is applied to the blade 53c shown in FIG. 12, the air flow amount can be increased by the amount of noise reduction. Therefore, it is possible to avoid an increase in size of the rotary electric machine. As a result, reduction in size of the rotary electric machine can be achieved, and it is possible to reduce costs of the rotary electric machine.

Furthermore, the rotary electric machine shown in FIG. 12 can cool the rotor 4 and the stator 13 more effectively as compared to a rotary electric machine having only an external fan or an internal fan mounted thereon.

While the rotary electric machine shown in FIG. 12 uses the blade 53 shown in FIGS. 2 to 6 only as the blade 53c, the usage is not limited thereto. The rotary electric machine shown in FIG. 12 can also use the blade 53 shown in FIGS. 2 to 6 as the blade 53d.

In the present embodiment, a case where the blade 53 shown in FIG. 6 is applied to the external fan 50a shown in FIG. 1, the external fan 50b shown in FIG. 11, and the internal-external-integrated fan 50c shown in FIG. 12 has been explained. However, the configuration is not limited thereto, and for example, the blade 53 according to the present embodiment is also applicable to an internal fan installed in a hermetic externally fan-cooled motor. For example, this internal fan is a publicly known fan that is arranged on the inside of the rotary electric machine, is mounted on the rotary shaft 1, and is formed such that air in the inside of the rotary electric machine can be circulated and delivered to the stator 13 and the rotor 4. Therefore, explanations thereof will be omitted.

In the present embodiment, there has been explained a case where the ring 52 shown in FIG. 2 is used in the external fan 50a shown in FIG. 1, in the external fan 50b shown in FIG. 11, and in the internal-external-integrated fan 50c shown in FIG. 12. However, the present embodiment is not limited thereto. For example, when the ring 52 is not used, although there is a possibility that swinging of the blade 53 occurs in a high rotation-speed range of the fan 50, effects identical to those described above can be also obtained.

As explained above, the rotary electric machine according to the present embodiment includes the stator 13, the rotor 4 that is arranged within the stator 13, the frame 10 that encloses the stator 13 and the rotor 4, a pair of the bearings 7a and 7b that respectively support the driving side 1a and the driven side 1b of the rotary shaft 1, and an internal fan that is installed on the inside of the rotary electric machine, is mounted on the rotary shaft 1, and stirs air in the inside of the rotary electric machine. A plurality of the blades 53 that extend in a radial direction of the rotor 4 and are provided to stand at a substantially equal interval in a rotation direction of the rotor 4 are formed in this internal fan, a cross section of each of the blades 53 in a direction perpendicular to the rotor 4 has an elliptical shape extending in the radial direction, and the cross section widens toward the fan side. With this configuration, a sufficient contact area between the main plate 51 and the blade 53 is ensured, and it is possible to suppress swinging of the blade rear-edge portion 57.

Furthermore, the rotary electric machine according to the present embodiment includes the stator 13, the rotor 4, the frame 10, the bearings 7a and 7b, and the external fan 50a or 50b. A plurality of the blades 53 that extend in a radial direction of the rotor 4 and are provided to stand at a substantially equal interval in a rotation direction of the rotor 4 are formed in the external fan 50a or 50b, a cross section of each of the blades 53 in a direction perpendicular to the rotor 4 has an elliptical shape extending in the radial direction, and the cross section widens toward the fan side. With this configuration, it is possible to suppress swinging of the blade rear-edge portion 57, as described above.

The rotary electric machine according to the present embodiment includes the stator 13, the rotor 4, the frame 10, the bearings 7a and 7b, and the internal-external-integrated fan 50c that is mounted on the driven side 1b of the rotor 4, delivers cooling air from the outside of the rotary electric machine to the stator 13, and stirs air in the inside of the rotary electric machine. A plurality of the blades 53 that extend in a radial direction of the rotor 4 and are provided to stand at a substantially equal interval in a rotation direction of the rotor 4 are formed in the internal-external-integrated fan 50c, a cross section of each of the blades 53 in a direction perpendicular to the rotor 4 has an elliptical shape extending in the radial direction, and the cross section widens toward the fan side. With this configuration, it is possible to suppress swinging of the blade rear-edge portion 57, as described above.

Furthermore, the blade 53 according to the present embodiment has a cross sectional shape in a direction perpendicular to the rotor 4 in which the shape does not have a straight portion. Therefore, noise generated from the fan 50 is significantly reduced as compared to a fan employing the conventional blade 63. The rotation amount of the external fan 50a can be increased by the amount of noise reduction, thereby increasing the air flow amount. Therefore, reduction in size of the rotary electric machine can be achieved, and it is possible to reduce costs of the rotary electric machine.

In the present embodiment, a mode in which the conventional blades 63 are all replaced with the blades 53 shown in FIG. 6 has been explained (see FIG. 3). However, the present embodiment is not limited thereto, and can also include a mode in which the blades 53 and the blades 63 shown in FIG. 7 are alternately arrayed.

As another example, the present invention can include a mode in which a plurality of blades 63 are arrayed consecutively, followed by arranging one blade 53. For example, three blades 63 are arrayed, then one blade 53 is arranged, and again three blades 63 are arrayed.

As still another example, the present invention can include a mode in which a plurality of blades 63 are arrayed consecutively, followed by arraying a plurality of blades 53. For example, three blades 63 are arrayed, then two blades 53 are arranged, and again three blades 63 are arrayed.

As still another example, the present invention can include a mode in which a plurality of blades 53 are arrayed consecutively, followed by arranging one blade 63. For example, three blades 53 are arrayed, then one blade 53 is arranged, and again three blades 53 are arrayed.

Even when blades are arrayed as described above, it is possible to reduce noise as compared to a fan including only the conventional blades 63. As the ratio of the blades 53 relative to the conventional blades 63 is higher, noise reduction effects are more enhanced. In addition, when a flat blade having a simple cross sectional shape and the blade 53 according to the present embodiment are used in combination, it is possible to reduce costs of the fan 50.

In the present embodiment, the blade 53 shown in FIGS. 2 to 6 is applied to a rotary electric machine for a railway vehicle; however, the present embodiment is not limited thereto, and the blade 53 is applicable to any fans.

The rotary electric machine described in the present embodiment is only an example of the contents of the present invention. The rotary electric machine can be combined with other well-known techniques, and it is needless to mention that the rotary electric machine can be configured while modifying it without departing from the scope of the present invention, such as omitting a part thereof.

INDUSTRIAL APPLICABILITY

As described above, the present invention is applicable to a rotary electric machine, and is useful as an invention that is capable of suppressing noise generated from a fan without decreasing an air flow amount.

REFERENCE SIGNS LIST 1 rotary shaft
1a driving side
1b driven side
2a, 2b air passage
2 rotor iron core
3 rotor conductor
4 rotor
7a, 7b bearing
8a driving-side bracket
8b driven-side bracket
9 fan cover
10 frame
11 stator iron core
12 stator winding
13 stator
14 inlet hole
15 outlet hole
20 filter
21, 22, 23, 24 stopper
50 fan
50a, 50b external fan
50c internal-external-integrated fan
51, 51a, 51b, 51c main plate
52, 52a, 52b, 52c ring
53, 53a, 53b, 53c, 53d, 63 blade
55, 63b blade side portion
56, 56a, 56b, 56c, 56d, 63a blade front-edge portion
57, 57a, 57b, 57c, 57d, 63c blade rear-edge portion
a first top
b second top, third top

The invention claimed is:

1. A rotary electric machine comprising:
a stator;
a rotor that is arranged within the stator;
a frame that encloses the stator and the rotor;
a pair of bearings that respectively support a driving side and a driven side of a rotary shaft; and
a fan that is installed on inside of the rotary electric machine, that is mounted on the rotary shaft, and that stirs air in the inside of the rotary electric machine, wherein
a plurality of blades that extend in a radial direction of the rotor and that are provided to stand at a substantially equal interval in a rotation direction of the rotor are formed in the fan, and
each of the blades is provided between a disk-shaped main plate that is formed with a through hole through which the rotary shaft is inserted and a ring that holds an end opposite to the main plate of the blade, and each of the blades has an elliptical shape extending in a direction from the through hole to an outer periphery of the main plate, and widens from the ring toward the main plate.

2. The rotary electric machine according to claim 1, wherein
a surface shape of each of the blades does not have a straight portion, and
a radius of curvature of the surface shape becomes larger from a first top in the rotation direction toward a second top in a center direction of the fan.

3. The rotary electric machine according to claim 1, wherein
a surface shape of each of the blades does not have a straight portion, and
a radius of curvature of the surface shape becomes larger from a first top in the rotation direction toward a third top in an outer peripheral direction of the fan.

4. The rotary electric machine according to claim 3, wherein
in the surface shape of each of the blades, a distance from the first top to the second top is shorter than a distance from the first top to the third top.

5. A rotary electric machine comprising:
a stator;
a rotor that is arranged within the stator;
a frame that encloses the stator and the rotor;
a pair of bearings that respectively support a driving side and a driven side of a rotary shaft; and
a fan that is installed on outside of the rotary electric machine, that is mounted on the rotary shaft, and that delivers cooling air from the outside of the rotary electric machine to the stator, wherein
a plurality of blades that extend in a radial direction of the rotor and that are provided to stand at a substantially equal interval in a rotation direction of the rotor are formed in the fan, and
each of the blades is provided between a disk-shaped main plate that is formed with a through hole through which the rotary shaft is inserted and a ring that holds an end opposite to the main plate of the blade, and each of the blades has an elliptical shape extending in a direction from the through hole to an outer periphery of the main plate, and widens from the ring toward the main plate.

6. The rotary electric machine according to claim 5, wherein
a surface shape of each of the blades does not have a straight portion, and
a radius of curvature of the surface shape becomes larger from a first top in the rotation direction toward a second top in a center direction of the fan.

7. The rotary electric machine according to claim 5, wherein
a surface shape of each of the blades does not have a straight portion, and
a radius of curvature of the surface shape becomes larger from a first top in the rotation direction toward a third top in an outer peripheral direction of the fan.

8. The rotary electric machine according to claim 7, wherein
in the surface shape of each of the blades, a distance from the first top to the second top is shorter than a distance from the first top to the third top.

9. A rotary electric machine comprising:
a stator;
a rotor that is arranged within the stator;
a frame that encloses the stator and the rotor;
a pair of bearings that respectively support a driving side and a driven side of a rotary shaft; and
a fan that is mounted on a driven side of the rotor, that delivers cooling air from outside of the rotary electric machine to the stator, and that stirs air in inside of the rotary electric machine, wherein
a plurality of blades that are arranged on a driven side, that extend in a radial direction of the rotor, and that are provided to stand at a substantially equal interval in a rotation direction of the rotor are formed in the fan, and each of the blades is provided between a disk-shaped main plate that is formed with a through hole through which the rotary shaft is inserted and a ring that holds an end opposite to the main plate of the blade, and each of the blades has an elliptical shape extending in a direction from the through hole to an outer periphery of the main plate, and widens from the ring toward the main plate.

10. The rotary electric machine according to claim 9, wherein
a surface shape of each of the blades does not have a straight portion, and
a radius of curvature of the surface shape becomes larger from a first top in the rotation direction toward a second top in a center direction of the fan.

11. The rotary electric machine according to claim 9, wherein
a surface shape of each of the blades does not have a straight portion, and
a radius of curvature of the surface shape becomes larger from a first top in the rotation direction toward a third top in an outer peripheral direction of the fan.

12. The rotary electric machine according to claim 11, wherein
in the surface shape of each of the blades, a distance from the first top to the second top is shorter than a distance from the first top to the third top.

* * * * *